(12) United States Patent
Nakai et al.

(10) Patent No.: US 7,674,552 B2
(45) Date of Patent: Mar. 9, 2010

(54) BATTERY HAVING LITHIUM FLUORIDE/LITHIUM HYDROXIDE COATING ON ANODE

(75) Inventors: Hideki Nakai, Fukushima (JP); Akinori Kita, Fukushima (JP); Tadahiko Kubota, Kanagawa (JP); Atsumichi Kawashima, Fukushima (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 11/313,374

(22) Filed: Dec. 21, 2005

(65) Prior Publication Data

US 2006/0134524 A1 Jun. 22, 2006

(30) Foreign Application Priority Data

Dec. 22, 2004 (JP) ............................ P2004-371341

(51) Int. Cl.
*H01M 4/58* (2006.01)
*H01M 6/16* (2006.01)
(52) U.S. Cl. .................... 429/216; 429/218.1; 429/199; 429/330; 429/342
(58) Field of Classification Search ............... 429/231.9, 429/216, 199, 330, 342, 218.1
See application file for complete search history.

(56) References Cited

U.S. PATENT DOCUMENTS

| | | | |
|---|---|---|---|
| 6,096,454 A * | 8/2000 | Tran et al. ................. | 429/231.8 |
| 6,949,312 B1 | 9/2005 | Kawakami et al. | |
| 6,964,829 B2 | 11/2005 | Utsugi et al. | |

FOREIGN PATENT DOCUMENTS

| | | |
|---|---|---|
| JP | 07302617 A * | 11/1995 |
| JP | 2000/311681 | 11/2000 |
| JP | 2002-141058 | 5/2002 |
| JP | 2002-208440 | 7/2002 |
| JP | 2003-100285 | 4/2003 |
| JP | 2004/109839 | 12/2004 |

* cited by examiner

*Primary Examiner*—Tracy Dove
(74) *Attorney, Agent, or Firm*—K&L Gates LLP

(57) ABSTRACT

A battery capable of improving battery characteristics such as cycle characteristics is provided. A coating containing lithium fluoride and lithium hydroxide is provided on the surface of an anode active material layer. The ratio between lithium fluoride and lithium hydroxide is in the range, in which the $Li_2F^+/Li_2OH^+$ peak intensity ratio obtained in positive ion analysis by a Time of Flight-Secondary Ion Mass Spectrometry is 1 or more. The anode active material layer contains a substance containing Si or Sn as an element as an anode active material. By the coating, oxidation of the anode active material layer is inhibited, and decomposition reaction of the electrolytic solution is inhibited.

11 Claims, 6 Drawing Sheets

BATTERY HAVING LITHIUM FLUORIDE/LITHIUM HYDROXIDE COATING ON ANODE

CROSS REFERENCES TO RELATED APPLICATIONS

The present application claims priority to Japanese Patent Application JP 2004-371341 filed in the Japanese Patent Office on Dec. 22, 2004, the entire contents of which is being incorporated herein by reference.

BACKGROUND

The present invention relates to a battery effective in the case that an anode active material layer which is capable of inserting and extracting lithium (Li) and contains a metal element or a metalloid element as an element is included.

As electronic technology has been advanced in recent years, portable electronic devices such as a combination camera, a mobile phone, and a laptop personal computer have been developed. Accordingly, as a power source for such electronic devices, development of small and light secondary batteries having a high energy density has been strongly demanded.

As a secondary battery meeting such a demand, a secondary battery using a light metal such as lithium (Li), sodium (Na), and aluminum (Al) as an anode active material is promising. According to such a secondary battery, a high voltage can be theoretically generated, and a high energy density can be obtained. In particular, since the secondary battery using a lithium metal as an anode active material can provide a higher output and a higher energy density, research and development thereof has been actively implemented.

However, when a light metal such as a lithium metal is used as an anode active material as it is, dendrite crystal of the light metal is easily precipitated on the anode in the process of charge and discharge. When the dendrite crystal is precipitated, the current density of the end thereof becomes very high, and therefore an electrolytic solution is easily decomposed and cycle characteristics are lowered. Further, when the dendrite crystal reaches the cathode, internal short circuit occurs.

Therefore, in order to prevent such precipitation of dendrite crystal, a secondary battery, not using a lithium metal as an anode active material as it is, but using an anode material capable of inserting and extracting lithium ions has been developed.

As such an anode material, carbon materials have been widely used traditionally. In recent years, in order to obtain a higher capacity, using silicon (Si), tin (Sn), or an alloy thereof has been considered (for example, refer to Japanese Unexamined Patent Application Publication No. 2000-311681).

However, there has been a disadvantage that in the anode material using silicon or tin as above, cycle characteristics are lower than in the carbon materials, and it is difficult to take advantage of the feature, the high capacity.

SUMMARY

In view of the foregoing, in the present invention, it is desirable to provide a battery capable of improving battery characteristics such as cycle characteristics.

According to an embodiment of the present invention, there is provided a battery including a cathode, an anode, and an electrolyte in which the anode has a coating in which the peak intensity ratio of $Li_2F^+$ to $Li_2OH^+$ ($Li_2F^+/Li_2OH^+$) obtained in positive ion analysis by a Time of Flight-Secondary Ion Mass Spectrometry is 1 or more.

According to the battery of the embodiment of the present invention, the coating with the peak intensity ratio ($Li_2F^+/Li_2OH^+$) of 1 more is included. Therefore, decomposition reaction of the electrolyte can be inhibited, and cycle characteristics can be improved.

In particular, when the anode has an anode active material layer which is capable of inserting and extracting lithium and contains at least one of metal elements and metalloid elements as an element, or when the anode has an anode active material layer containing at least one of silicon and tin as an element, high effects can be obtained.

Additional features and advantages are described herein, and will be apparent from, the following Detailed Description and the figures.

DETAILED DESCRIPTION

Embodiments of the present invention will be hereinafter described in detail with reference to the drawings.

First Embodiment

Figure 1:
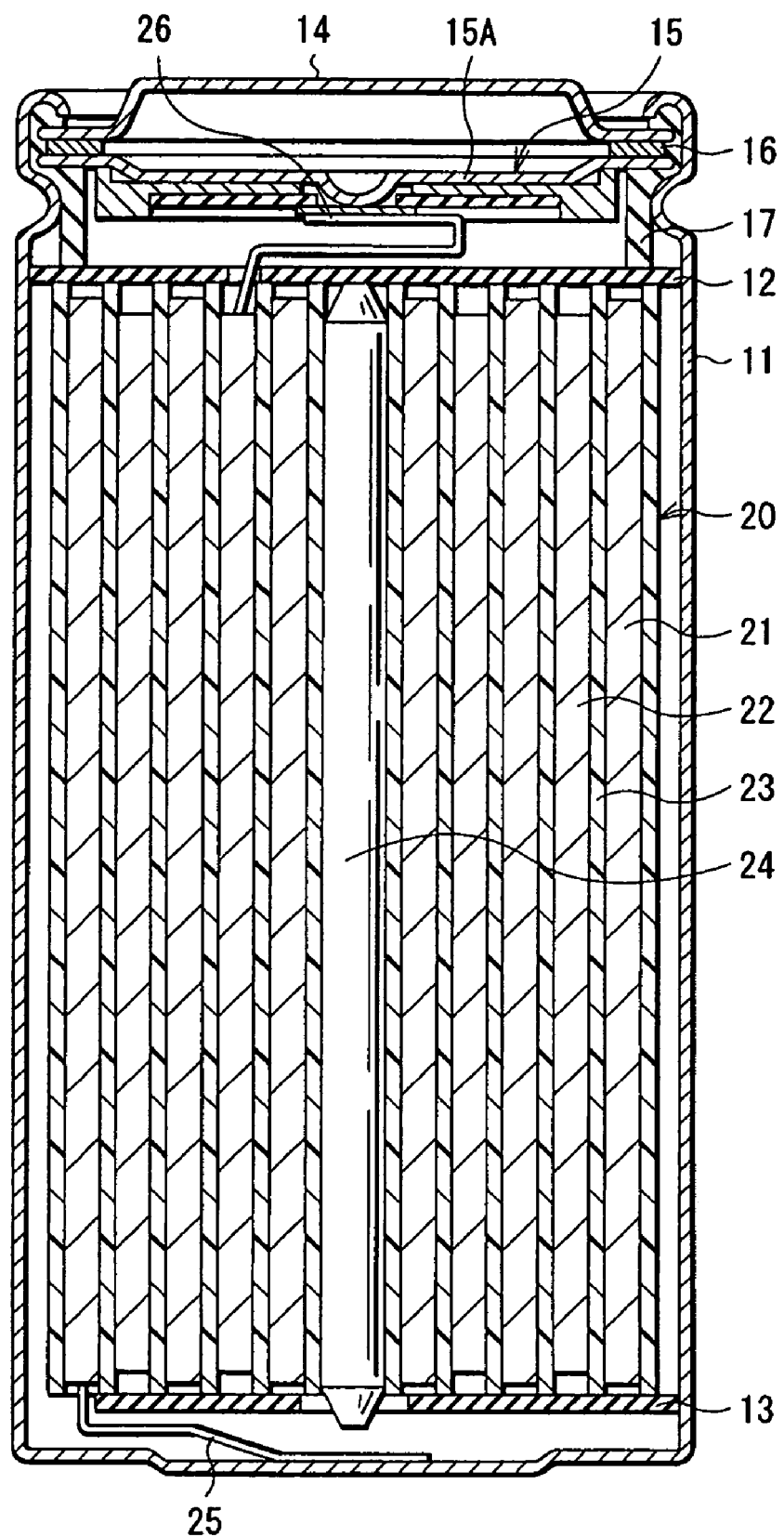
FIG. 1 is a cross section showing a structure of a secondary battery according to a first embodiment of the present invention.

FIG. 1 shows a cross sectional structure of a secondary battery according to a first embodiment of the present invention. The secondary battery is a so-called cylinder-type battery, and has a spirally wound electrode body 20 in which a strip-shaped anode 21 and a strip-shaped cathode 22 are layered with a separator 23 in between and wound inside a battery can 11 in the shape of approximately hollow cylinder. The battery can 11 is made of, for example, iron plated by nickel. One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. An anode lead 25 made of nickel or the like is connected to the anode 21. A cathode lead 26 made of aluminum or the like is connected to the cathode 22. The anode lead 25 is welded and electrically connected to the battery can 11. The cathode lead 26 is electrically connected to the battery cover 14 by being welded to the safety valve mechanism 15.

Figure 2:
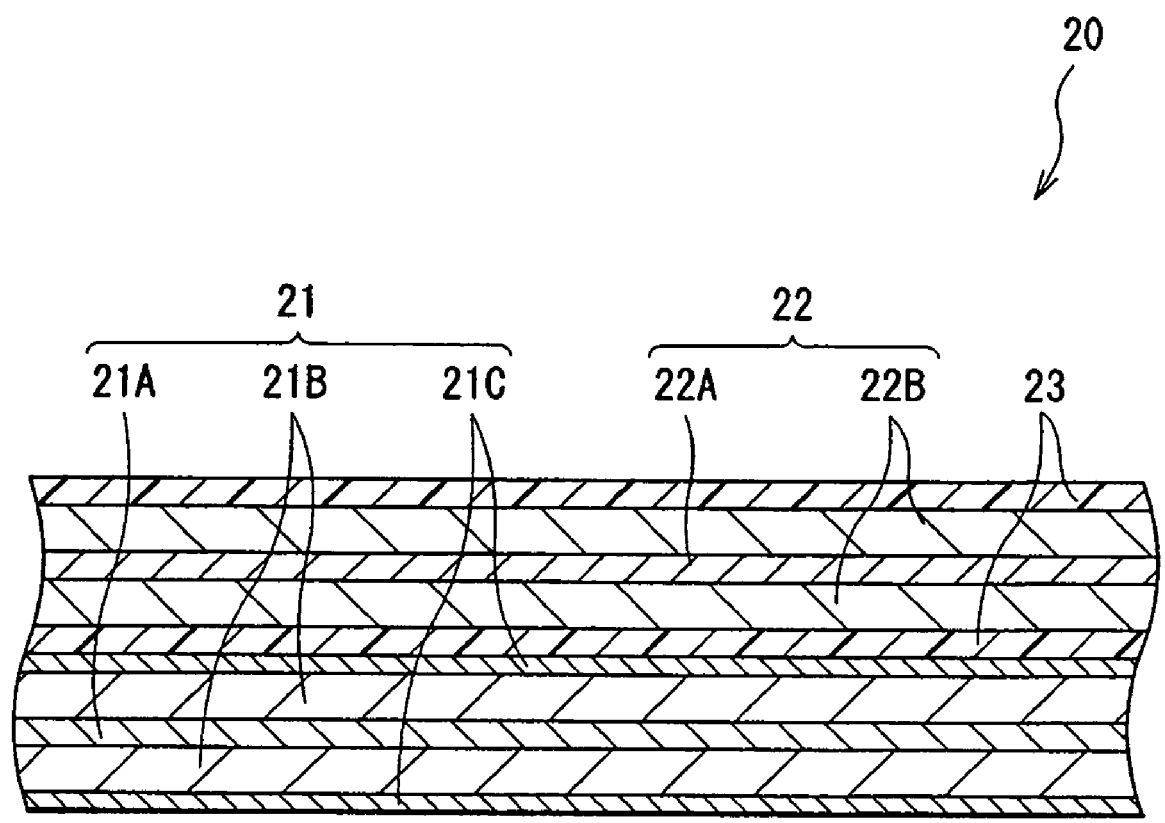
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The anode 21 has a structure in which, for example, an anode active material layer 21B is provided on the both faces of an anode current collector 21A having a pair of opposed faces. The anode current collector 21A is made of, for example, a metal foil such as a copper (Cu) foil, a nickel (Ni) foil, and a stainless foil.

The anode active material layer 21B contains, for example, one or more anode materials capable of inserting and extracting lithium as an anode active material. As such an anode material, for example, a substance containing at least one of metal elements and metalloid elements capable of forming an alloy with lithium as an element can be cited. Such a substance may be a simple substance, an alloy, or a compound of a metal element or a metalloid element, or a material having one or more phases thereof at least in part. In the present invention, alloys include an alloy containing one or more metal elements and one or more metalloid elements in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element capable of forming an alloy with lithium, for example, magnesium (Mg), boron (B), aluminum, gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like can be utilized.

Specially, as such an anode material, a material containing a metal element or a metalloid element of Group 14 in the long period periodic table as an element is preferable. A material containing at least one of silicon and tin as an element is particularly preferable. Silicon and tin have a high ability to insert and extract lithium, and provide a high energy density. Specifically, for example, a simple substance, an alloy, or a compound of silicon; a simple substance, an alloy, or a compound of tin; or a material having one or more phases thereof at least in part can be cited.

As an alloy of silicon, for example, an alloy containing at least one from the group consisting of tin, nickel, copper, iron (Fe), cobalt (Co), manganese (Mn), zinc, indium, silver, titanium (Ti), germanium, bismuth, antimony (Sb), and chromium (Cr) as a second element other than silicon can be cited. As an alloy of tin, for example, an alloy containing at least one from the group consisting of silicon, nickel, copper, iron, cobalt, manganese, zinc, indium, silver, titanium, germanium, bismuth, antimony, and chromium as a second element other than tin can be cited.

As a compound of tin or a compound of silicon, for example, a compound containing oxygen (O) or carbon (C) can be cited. In addition to tin or silicon, the compound may contain the foregoing second element.

As an anode material capable of inserting and extracting lithium, for example, a carbon material such as graphite, non-graphitizable carbon, and graphitizable carbon may be used. Further, such carbon material may be used together with the foregoing anode material. The carbon materials are preferably used. The reason thereof is that change of crystal structure due to insertion and extraction of lithium is very little, and for example, when the carbon material is used with the foregoing anode material, a higher energy density can be obtained, superior cycle characteristics can be obtained, and function as an electrical conductor can be thereby obtained.

The anode active material layer 21B may further contain other anode active material. Further, the anode active material layer 21B may contain other material such as a binder and a thickener.

Further, the anode 21 has a coating 21C containing lithium fluoride and lithium hydroxide on the surface of the anode active material layer 21B. The ratio between lithium fluoride and lithium hydroxide in the coating 21C is in the range, in which the peak intensity ratio of $Li_2F^+$ to $Li_2OH^+$ (hereinafter referred to as $Li_2F^+/Li_2OH^+$ peak intensity ratio) obtained in positive ion analysis by a Time of Flight-Secondary Ion Mass Spectrometry (TOF-SIMS) is 1 or more. Thereby, in the anode 21, oxidation of the anode active material layer 21B can be inhibited, and side reaction in the anode 21 can be inhibited. Further, the ratio between lithium fluoride and lithium hydroxide in the coating 21C is preferably in the range, in which the $Li_2F^+/Li_2OH^+$ peak intensity ratio is 4 or more, since higher effects can be thereby obtained. The thickness of the coating 21C is preferably 100 nm or less. The thicker the coating is, the larger the resistance becomes.

The cathode 22 has a structure in which, for example, a cathode active material layer 22B is provided on the both faces of a cathode current collector 22A having a pair of opposed faces. The cathode current collector 22A is made of, for example, a metal foil such as an aluminum foil, a nickel foil, and a stainless foil.

The cathode active material layer 22B contains, for example, as a cathode active material, one or more cathode materials capable of inserting and extracting lithium. If necessary, the cathode active material layer 22B may contain an electrical conductor such as a carbon material and a binder such as polyvinylidene fluoride. As a cathode material capable of inserting and extracting lithium, for example, a lithium complex oxide containing lithium and transition metals or a lithium phosphate compound is preferable. The lithium complex oxide containing lithium and transition metals and the lithium phosphate compound can generate a high voltage, and can contribute to a high capacity.

As a lithium complex oxide or a lithium phosphate compound, a compound containing as a transition metal, at least one from the group consisting of cobalt, nickel, manganese, iron, aluminum, vanadium (V), titanium, chromium, and copper is preferable. In particular, a compound containing at least one from the group consisting of cobalt, nickel, and manganese is preferable. The formula thereof is expressed by, for example, $Li_xMIO_2$ or $Li_yMIIPO_4$. In the formula, MI and MII represent one or more transition metal elements. Values of x and y vary according to charge and discharge states of the battery, and the values of x and y are generally in the range of $0.05 \leq x \leq 1.10$ and $0.05 \leq y \leq 1.10$.

As a specific example of the complex oxide containing lithium and transition metal elements, a lithium cobalt complex oxide ($Li_xCoO_2$), a lithium nickel complex oxide ($Li_xNiO_2$), a lithium nickel cobalt complex oxide ($Li_xNi_{1-v}$ $CO_vO_2$ (v<1)), or a lithium manganese complex oxide having a spinel type structure ($Li_xMn_2O_4$) can be cited. As a lithium phosphate compound, for example, lithium iron phosphate compound ($LiFePO_4$) or a lithium iron manganese phosphate compound ($LiFe_{1-z}Mn_zPO_4$ (z<1)) can be cited.

The separator 23 separates the anode 21 from the cathode 22, prevents current short circuit due to contact of both electrodes, and lets through lithium ions. The separator 23 is made of, for example, a synthetic resin porous film made of polytetrafluoroethylene, polypropylene, polyethylene or the like, or a ceramics porous film. The separator 23 may have a structure in which two or more of the foregoing porous films are layered.

An electrolytic solution as the liquid electrolyte is impregnated in the separator 23. The electrolytic solution contains, for example, a solvent and an electrolyte salt dissolved in the solvent. If necessary, various additives may be contained.

As a solvent, for example, a nonaqueous solvent such as propylene carbonate, ethylene carbonate, diethyl carbonate, dimethyl carbonate, 1,2-dimethoxy ethane, 1,2-diethoxy ethane, γ-butyrolactone, tetrahydrofuran, 1,3-dioxolan, 4-methyl-1,3-dioxolan, diethyl ether, sulfolane, methyl sulfolane, acetonitrile, propionitrile, vinylene carbonate, halogenated chain ester carbonate, and halogenated cyclic ester carbonate can be cited. The solvent may be used singly, or two or more thereof may be used by mixing.

As an electrolyte salt, for example, a lithium salt such as $LiPF_6$, $LiBF_4$, $LiClO_4$, $LiAsF_6$, $LiB(C_6H_5)_4$, LiCl, LiBr, $LiCH_3SO_3$, and $LiCF_3SO_3$ can be utilized. As an electrolyte salt, any of the forgoing may be used singly, or two or more thereof may be used by mixing.

The secondary battery can be manufactured, for example, as follows.

First, for example, the anode active material layer 21B is formed on the anode current collector 21A. The anode active material layer 21B may be formed by, for example, vapor-phase deposition method, liquid-phase deposition method, firing method, coating, or two or more of these methods.

As vapor-phase deposition method, for example, physical deposition method or chemical deposition method can be used. Specifically, vacuum vapor deposition method, sputtering method, ion plating method, laser ablation method, thermal CVD (Chemical Vapor Deposition) method, plasma CVD method, thermal spraying and the like are available. As liquid-phase deposition method, a known technique such as electrolytic plating and electroless plating is available.

Firing method is a method in which, for example, a particulate anode active material, a binder and the like are mixed, the mixture is dispersed in a solvent, an anode current collector is coated with the resultant, which is heat-treated at temperatures higher than the melting point of the binder or the like. For firing method, a known technique such as atmosphere firing method, reactive firing method, and hot press firing method is available. In the case of coating, for example, the anode active material layer 21B is formed by mixing a particulate anode active material with a binder or the like, dispersing the mixture in a solvent, coating the anode current collector with the resultant, which is dried and compression-molded.

Further, the cathode 22 is formed by forming the cathode active material layer 22B on the cathode current collector 22A. The cathode active material layer 22B is formed, for example, as follows. For example, a particulate cathode active material, an electrical conductor, and a binder are mixed to prepare a cathode mixture, which is dispersed in a solvent. Then, the cathode current collector 22A is coated with the resultant, which is dried and compression-molded, and then the cathode active material layer 22B is formed.

Next, the anode lead 25 is attached to the anode current collector 21A, and the cathode lead 26 is attached to the cathode current collector 22A. Subsequently, the anode 21 and the cathode 22 are wound with the separator 23 in between. The end of the anode lead 25 is welded to the battery can 11, and the end of the cathode lead 26 is welded to the safety valve mechanism 15. The wound anode 21 and the wound cathode 22 are sandwiched between the pair of insulating plates 12 and 13, and contained inside the battery can 11. After that, an electrolytic solution is injected into the battery can 11, and the battery cover 14, the safety valve mechanism 15, and the PTC device 16 are fixed to the open end of the battery can 11 by being caulked through the gasket 17.

Then, a fluorine containing compound is added to the electrolytic solution. For example, a fluorine containing compound may be used for the solvent. Otherwise, separately from the solvent, a fluorine containing compound may be added as an additive for forming the coating 21C. Next, charge and discharge are performed, and the coating 21C is electrochemically formed on the surface of the anode active material layer 21B. The ratio between lithium fluoride and lithium hydroxide in the coating 21C can be controlled by adjusting charge conditions such as a charge current value. Thereby, the secondary battery shown in FIGS. 1 and 2 is completed.

It is possible that the coating 21C is formed before the battery is assembled instead that the coating 21C is electrochemically formed after the battery is assembled. For example, the coating 21C may be formed on the anode active material layer 21B by vapor-phase deposition method or the like, or the coating 21C may be electrochemically formed by using an electrolytic solution.

In the secondary battery, when charged, for example, lithium ions are extracted from the cathode 22 and inserted in the anode 21 through the electrolytic solution. When discharged, for example, lithium ions are extracted from the anode 21 and inserted in the cathode 22 through the electrolytic solution. Then, since the coating 21C with the $Li_2F^+$/$Li_2OH^+$ peak intensity ratio of 1 or more is formed on the surface of the anode 21, oxidation of the anode active material layer 21B is inhibited, and decomposition reaction of the electrolytic solution in the anode 21 is inhibited.

In particular, when the substance containing as an element at least one of metal elements and metalloid elements capable of forming an alloy with lithium is used as an anode active material, activity of the anode 21 becomes high. However, by providing the coating 21C on the anode 21, decomposition reaction is effectively inhibited.

As above, according to this embodiment, since the anode 21 has the coating 21C with the $Li_2F^+$/$Li_2OH^+$ peak intensity ratio of 1 or more, oxidation of the anode active material layer 21B can be inhibited, and decomposition reaction of the electrolytic solution can be inhibited. Therefore, battery characteristics such as cycle characteristics can be improved. In particular, when the substance containing as an element, at least one of metal elements and metalloid elements capable of forming an alloy with lithium is used as an anode active material, higher effects can be obtained.

Second Embodiment

Figure 3:
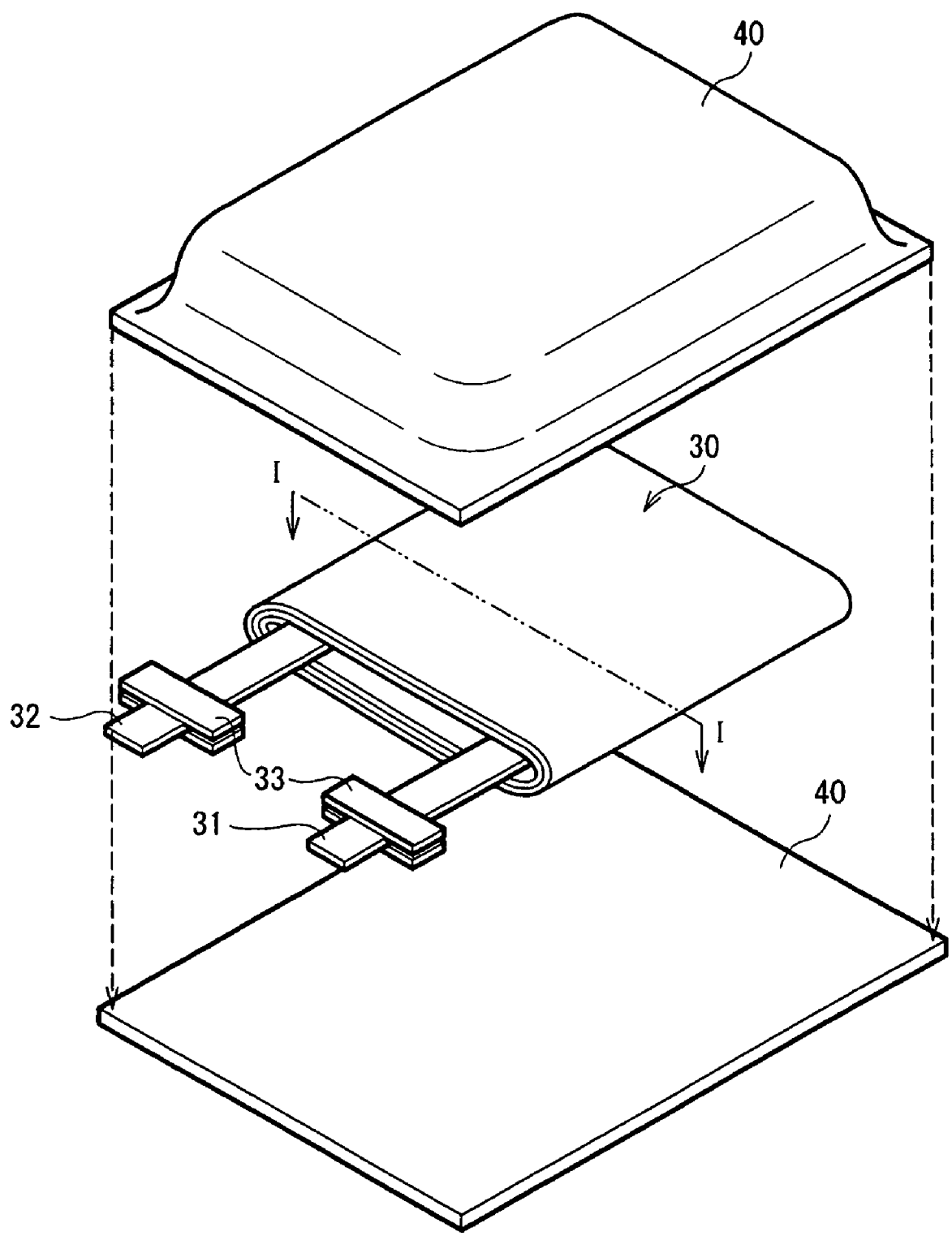
FIG. 3 is an exploded perspective view showing a structure of a secondary battery according to a second embodiment of the present invention.

FIG. 3 shows a structure of a secondary battery according to a second embodiment of the present invention. The secondary battery is a so-called laminated film-type secondary battery. In the secondary battery, a spirally wound electrode body 30 on which a cathode lead 31 and an anode lead 32 are attached is contained inside a film package member 40.

The anode lead 31 and the cathode lead 32 are respectively directed from inside to outside of the package member 40 in the same direction, for example. The anode lead 31 and the cathode lead 32 are respectively made of, for example, a metal material such as aluminum, copper, nickel, and stainless, and are in a state of thin plate or mesh, respectively.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive. Adhesive films 33 to protect from outside air intrusion are inserted between the package member 40 and the anode lead 31, the cathode lead 32. The adhesive film 33 is made of a material having contact characteristics to the anode lead 31 and the cathode lead 32 such as a polyolefin resin of polyethylene, polypropylene, modified polyethylene, and modified polypropylene.

The package member 40 may be made of a laminated film having other structure, a high molecular weight film such as polypropylene, or a metal film, instead of the foregoing aluminum laminated film.

Figure 4:
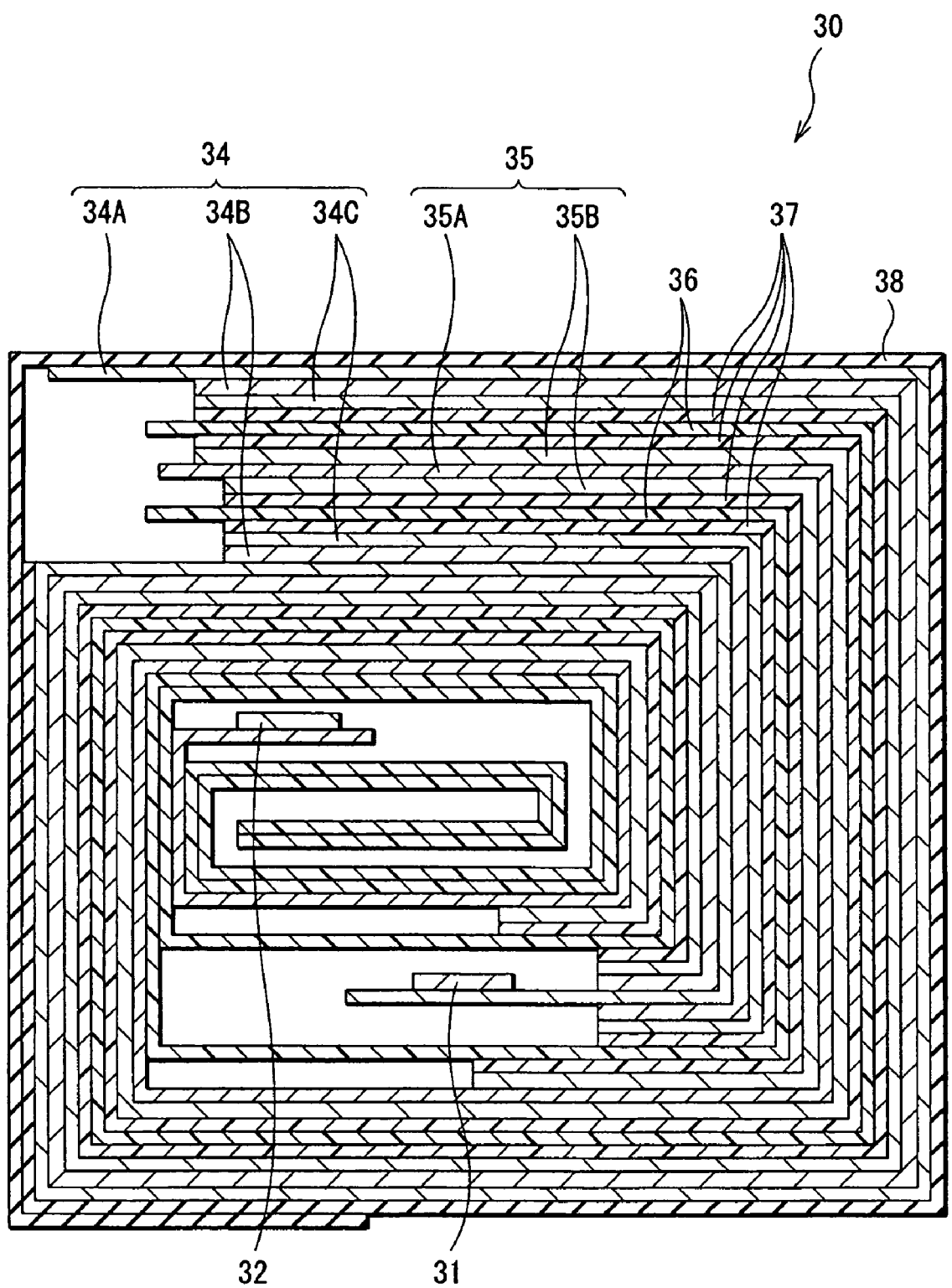
FIG. 4 is a cross section showing a structure taken along line I-I of a spirally wound electrode body in the secondary battery shown in FIG. 3.

FIG. 4 shows a cross sectional structure taken along line I-I of the spirally wound electrode body 30 shown in FIG. 3. In the spirally wound electrode body 30, an anode 34 and a cathode 35 are layered with a separator 36 and an electrolyte layer 37 in between and wound. The outermost periphery thereof is protected by a protective tape 38.

The anode 34 has a structure in which the anode active material layer 34B is provided on the both faces of the anode current collector 34A. A coating 34C is formed on the surface of the anode active material layer 34B. The cathode 35 has a structure in which a cathode active material layer 35B is provided on the both faces of the cathode current collector 35A. Arrangement is made so that the cathode active material layer 35B and the anode active material layer 34B are opposed. Structures of the anode current collector 34A, the anode active material layer 34B, the coating 34C, the cathode current collector 35A, the cathode active material layer 35B, and the separator 36 are similar to of the anode current collector 21A, the anode active material layer 21B, the coating 21C, the cathode current collector 22A, the cathode active material layer 22B, and the separator 23 in the first embodiment described above.

The electrolyte layer 37 is in a so-called gelatinous state, containing an electrolytic solution and a high molecular weight compound to hold the electrolytic solution. The gelatinous electrolyte is preferable, since a high ion conductivity can be thereby obtained, and leak of the battery can be thereby prevented. The structure of the electrolytic solution (that is, a solvent, an electrolyte salt and the like) is similar to of the first embodiment described above. As a high molecular weight material, for example, an ether high molecular weight compound such as polyethylene oxide and a cross-linked body containing polyethylene oxide, a polymer of vinylidene fluoride such as polyvinylidene fluoride and a copolymer of vinylidene fluoride and hexafluoropropylene, or polyacrylonitrile can be cited. One thereof is used, or two or more thereof are used by mixing. In particular, in view of redox stability, a fluorinated high molecular weight compound such as the polymer of vinylidene fluoride is desirably used.

The secondary battery can be manufactured, for example, as follows.

First, as in the first embodiment, the anode active material layer 34B is formed on the anode current collector 34A, and the cathode active material layer 35B is formed on the cathode current collector 35A. After that, the anode active material layer 34B and the cathode active material layer 35B are respectively coated with a precursor solution containing an electrolytic solution, a high molecular weight compound, and a mixed solvent. The mixed solvent is volatilized to form the electrolyte layer 37. Then, for example, a fluorine containing compound is added to the electrolytic solution. Next, the anode lead 31 is attached to the anode current collector 34A, and the cathode lead 32 is attached to the cathode current collector 35A. After that, the anode 34 and the cathode 35 are layered and wound with the separator 36 in between to obtain a lamination. The protective tape 38 is adhered to the outermost periphery thereof to form the spirally wound electrode body 30. Subsequently, for example, the spirally wound electrode body 30 is sandwiched between the package members 40, and outer edges of the package members 40 are contacted by thermal fusion-bonding or the like to enclose the spirally wound electrode body 30. After that, charge and discharge are performed, and the coating 34C is electrochemically formed on the surface of the anode active material layer 34B. Thereby, the secondary battery shown in FIGS. 3 and 4 is completed.

Otherwise, the secondary battery may be fabricated as follows. First, the anode active material layer 34B is formed on the anode current collector 34A, and the cathode active material layer 35B is formed on the cathode current collector 35A. After that, the anode lead 31 and the cathode lead 32 are attached to the anode 34 and the cathode 35, which are wound with the separator 45 in between to obtain a lamination. The protective tape 38 is adhered to the outermost periphery thereof to form the spirally wound electrode body, which is the precursor of the spirally wound electrode body 30. Next, the winding body is sandwiched between the package members 40, the outermost peripheries except for one side are thermal fusion-bonded to obtain a pouched state, and the winding body is contained inside the package member 40. Subsequently, a composition of matter for electrolyte containing an electrolytic solution, a monomer as the raw material for the high molecular weight compound, a polymerization initiator, and if necessary other material such as a polymerization inhibitor is prepared, which is injected into the package member 40. Then, for example, a fluorine containing compound is added to the electrolytic solution. After that, the opening of the package member 40 is thermal fusion-bonded and hermetically sealed. Next, the resultant is heated to polymerize the monomer to obtain a high molecular weight compound. Thereby, the gelatinous electrolyte layer 37 is formed. Subsequently, charge and discharge are performed, and the coating 34C is electrochemically formed on the surface of the anode active material layer 34B. Thereby, the secondary battery shown in FIGS. 3 and 4 is completed.

In this embodiment, as in the first embodiment, the coating 34C may be formed before the battery is assembled.

The secondary battery works and provides effects similarly to the first embodiment.

EXAMPLES

Further, specific examples of the present invention will be hereinafter given in detail.

Figure 5:
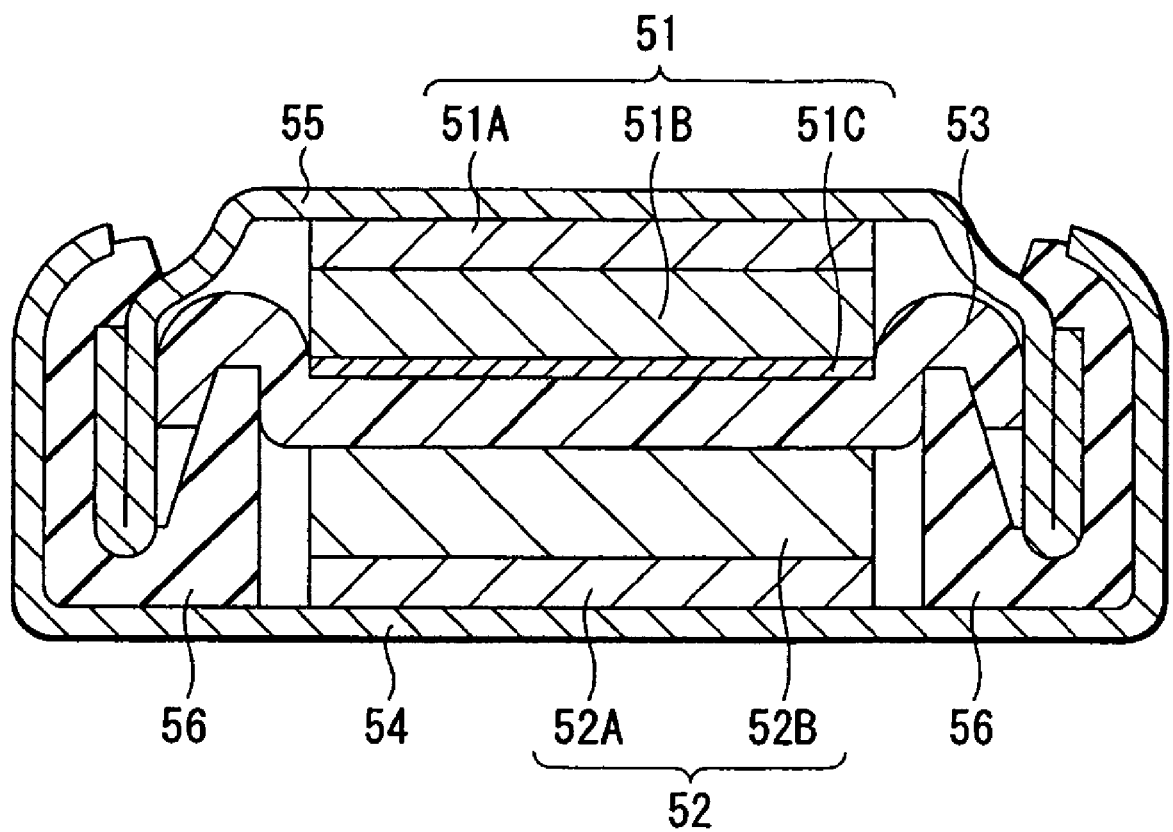
FIG. 5 is a cross section showing a structure of a secondary battery fabricated in examples of the present invention.

The coin-type secondary battery as shown in FIG. 5 was fabricated. In the secondary battery, an anode 51 and a cathode 52 were layered with a separator 53 in between, and the lamination was enclosed between a package can 54 and a package cup 55.

Example 1

First, by using silicon as an anode active material, an anode active material layer 51B made of silicon was deposited on an anode current collector 51A made of a copper foil by vacuum vapor deposition method. The resultant was heat-treated in the vacuum atmosphere. Further, lithium cobalt complex oxide ($LiCoO_2$) was prepared as a cathode active material. 91 parts by weight of the lithium cobalt complex oxide powder, 6 parts by weight of graphite as the electrical conductor, 3 parts by weight of polyvinylidene fluoride as the binder were mixed, and the mixture was dispersed in N-methyl-2-pyrrolidone as the solvent. Next, a cathode current collector 52A made of an aluminum foil was coated with the resultant, which was dried, and then compression-molded by a rolling press machine to form a cathode active material layer 52B and form the cathode 52.

Subsequently, the formed anode 51 and the formed cathode 52 layered with the separator 53 made of a microporous polypropylene film in between were laid on the package can 54, over which an electrolytic solution was injected, the package cup 55 was laid thereon, and the package can 54 and the package cup 55 were hermetically sealed by being caulked with a gasket 56. For the electrolytic solution, an electrolytic solution obtained by dissolving $LiClO_4$ as an electrolyte salt at a concentration of 1 mol/l in the solvent, in which 4-fluoro-1,3-dioxolan-2-one and diethyl carbonate were mixed at a volume ratio of 1:1, was used in Example 1, and an electrolytic solution obtained as in Example 1 except that 4,5-difluoro-1,3-dioxolan-2-one was used instead of 4-fluoro-1,3-dioxolan-2-one was used in Example 2.

After that, charge and discharge were performed, the coating 51C was formed on the anode 51, and the discharge capacity at the second cycle, the capacity retention ratio at the 30th cycle to the second cycle, and charge and discharge efficiency at the second cycle were obtained. Then, charge was performed until the battery voltage reached 4.2 V at a constant current density of 1 $mA/cm^2$, and then performed until the current density reached 0.02 $mA/cm^2$ at a constant voltage of 4.2 V. Discharge was performed until the battery voltage reached 2.5 V at a constant current density of 1 $mA/cm^2$. The results are shown in Table 1.

Figure 6:
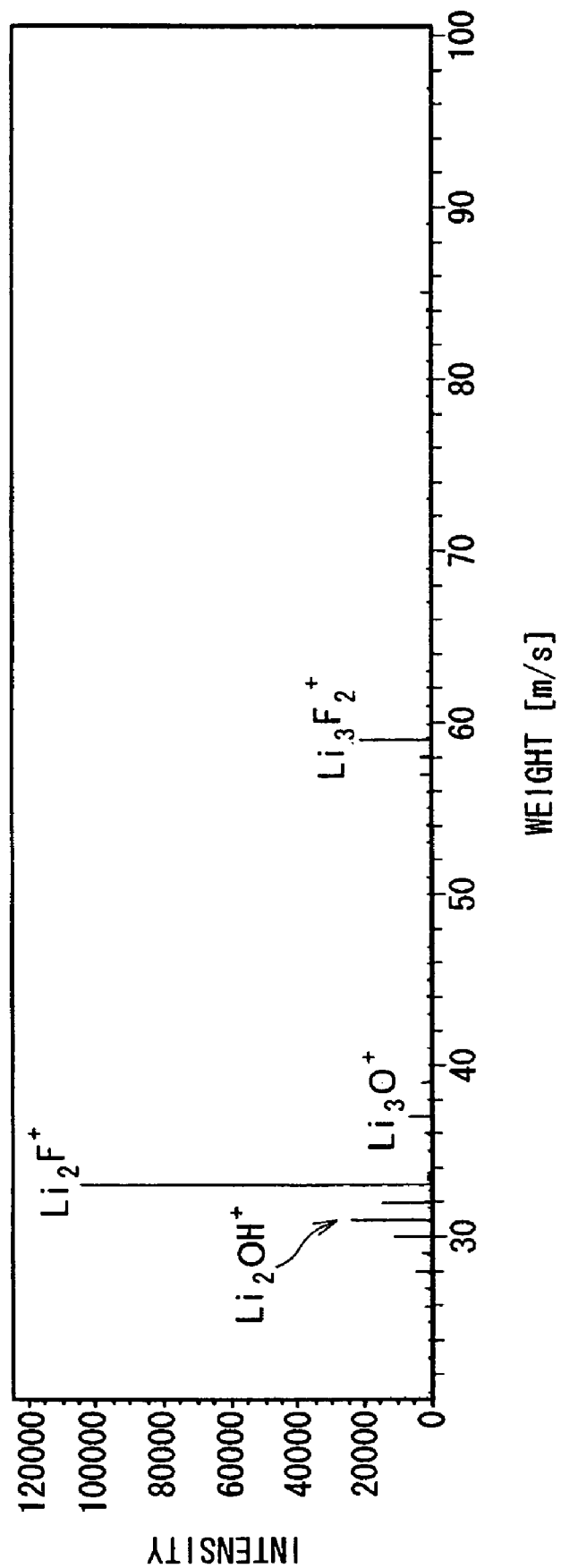
FIG. 6 is a characteristics view showing a result of positive ion analysis of an anode according to Example 1.

Further, after charge and discharge were performed 30 cycles, the battery was decomposed in the argon atmosphere to take out the anode 51. The taken out anode 51 was washed with dimethyl carbonate, vacuum-dried, and provided with positive ion analysis by a Time of Flight-Secondary Ion Mass Spectrometry. For the analysis, TFS-2000 of Ulvac-phi, Inc. was used. Analysis conditions were primary ion of $^{197}Au^+$, ion current of 2 nA (measuring value by continuous beam), weight range from 1 to 1850 amu, and scanning range of 300×300 $\mu m^2$. The $Li_2F^+/Li_2OH^+$ peak intensity ratio obtained from the result is shown in Table 1, and the result of Example 1 is shown in FIG. 6. FIG. 6 is a spectrum obtained by sputtering with $^{197}Au^+$ ion, the thickness of about 1 μm from the surface by converting into silicon. Since no peak of silicon $Si^+$ composing the anode active material layer 51B is shown in FIG. 6, it is found that the coating 51C containing lithium fluoride and lithium hydroxide was formed on the surface of the anode active material layer 51B.

Example 3

A secondary battery was assembled as in Example 1, except that the coating 51C containing lithium fluoride and lithium hydroxide was formed on the anode active material layer 51B by vapor-deposition method, and ethylene carbonate was used for the electrolytic solution instead of 4-fluoro-1,3-dioxolan-2-one. Further, as in Example 1, the discharge capacity at the second cycle, the capacity retention ratio at the 30th cycle to the second cycle, and the charge and discharge efficiency at the second cycle were obtained. The results are also shown in Table 1. The composition of the coating 51C was adjusted so that the $Li_2F^+/Li_2OH^+$ peak intensity ratio became 1 or more by adjusting deposition conditions, and the thickness of the coating 51C was 100 μm or less.

Examples 4 to 6

Secondary batteries were assembled as in Example 1. After that, the discharge capacity at the second cycle, the capacity retention ratio at the 30th cycle to the second cycle, and the charge and discharge efficiency at the second cycle were obtained as in Example 1, except that charge and discharge were performed by changing the current density in charge and discharge. The current density in charge and discharge was 0.75 $mA/cm^2$ in Example 4, 2 $mA/cm^2$ in Example 5, and 5 $mA/cm^2$ in Example 6. Further, as in Example 1, the anode 51 was taken out and the $Li_2F^+/Li_2OH^+$ peak intensity ratio was examined. The results are also shown in Table 1.

Examples 7 and 8

Secondary batteries were assembled as in Example 1 or Example 2. After that, the discharge capacity at the second cycle, the capacity retention ratio at the 30th cycle to the second cycle, and the charge and discharge efficiency at the second cycle were obtained as in Examples 1 and 2, except that the voltage in charge was 4.3 V. That is, charge was performed until the battery voltage reached 4.3 V at the constant current density of 1 $mA/cm^2$, and then performed until the current density reached 0.02 $mA/cm^2$ at a constant voltage of 4.3 V. An electrolytic solution similar to of Example 1 was used in Example 7, and an electrolytic solution similar to of Example 2 was used in Example 8. Further, as in Example 1, the anode 51 was taken out and the $Li_2F^+/Li_2OH^+$ peak intensity ratio was examined. The results are also shown in Table 1.

Examples 9 and 10

Secondary batteries were assembled as in Example 1 or Example 2. After that, the discharge capacity at the second cycle, the capacity retention ratio at the 30th cycle to the second cycle, and the charge and discharge efficiency at the second cycle were obtained as in Examples 1 and 2, except that the charge conditions were changed. Charge was performed by applying voltage of 4.8 V in a pulse of 100 kHz at the constant current density of 1 $mA/cm^2$ until the battery voltage reached 4.2 V, and then performed until the current density reached 0.02 $mA/cm^2$ at a constant voltage of 4.2 V. An electrolytic solution similar to of Example 1 was used in Example 9, and an electrolytic solution similar to of Example 2 was used in Example 10. Further, as in Example 1, the anode 51 was taken out and the $Li_2F^+/Li_2OH^+$ peak intensity ratio was examined. The results are also shown in Table 1.

Comparative Example 1

A secondary battery was assembled as in Example 1, except that ethylene carbonate was used for the electrolytic solution instead of 4-fluoro-1,3-dioxolan-2-one. Further, as in Example 1, the discharge capacity at the second cycle, the capacity retention ratio at the 30th cycle to the second cycle, and the charge and discharge efficiency at the second cycle were obtained. Further, as in Example 1, the anode was taken out and the $Li_2F^+/Li_2OH^+$ peak intensity ratio was examined. The results are also shown in Table 1.

Comparative Example 2

A secondary battery was assembled as in Example 1. After that, the discharge capacity at the second cycle, the capacity retention ratio at the 30th cycle to the second cycle, and the charge and discharge efficiency at the second cycle were obtained as in Example 1, except that charge and discharge were performed with current density in charge and discharge of 10 mA/cm$^2$. Further, as in Example 1, the anode was taken out and the $Li_2F^+/Li_2OH^+$ peak intensity ratio was examined. The results are also shown in Table 1.

|  | Discharge capacity (mAh) | Capacity retention ratio (%) | Charge and discharge efficiency (%) | $Li_2F^+/Li_2OH^+$ peak intensity ratio |
|---|---|---|---|---|
| Example 1 | 5.47 | 87 | 99.7 | 5.2 |
| Example 2 | 5.35 | 84 | 99.5 | 4.1 |
| Example 3 | 5.45 | 85 | 99.5 | 1 or more |
| Example 4 | 5.48 | 87 | 99.8 | 5.3 |
| Example 5 | 5.43 | 86 | 99.6 | 4.8 |
| Example 6 | 4.98 | 81 | 98.4 | 1.0 |
| Example 7 | 5.43 | 85 | 99.4 | 5.0 |
| Example 8 | 5.31 | 83 | 99.1 | 4.0 |
| Example 9 | 5.36 | 85 | 99.3 | 4.3 |
| Example 10 | 5.32 | 84 | 99.2 | 4.1 |
| Comparative example 1 | 3.99 | 76 | 97.5 | 0.0 |
| Comparative example 2 | 4.17 | 77 | 97.7 | 0.9 |

(Result)

As shown in Table 1, according to Examples 1 to 10 with the $Li_2F^+/Li_2OH^+$ peak intensity ratio of 1 or more, the discharge capacity, the capacity retention ratio, and the charge and discharge efficiency could be improved more than in Comparative examples 1 and 2 with the $Li_2F^+/Li_2OH^+$ peak intensity ratio under 1. Further, in the case that the $Li_2F^+/Li_2OH^+$ peak intensity ratio was 4 or more, higher values could be obtained.

That is, it was found that when the coating SIC with the $Li_2F^+/Li_2OH^+$ peak intensity ratio of 1 or more was formed, battery characteristics such as the discharge capacity, the capacity retention ratio, and the charge and discharge efficiency could be improved. It was also found that when the coating 51C with the $Li_2F^+/Li_2OH^+$ peak intensity ratio of 4 or more was formed, higher effects could be obtained.

The present invention has been described with reference to the embodiments and the examples. However, the present invention is not limited to the embodiments and the examples, and various modifications may be made. For example, in the foregoing embodiments and examples, descriptions have been given of the case using the electrolytic solution as an electrolyte. Further, in the foregoing embodiment, descriptions have been given of the case using the gelatinous electrolyte in which the electrolytic solution is held in the high molecular weight compound. However, other electrolyte may be used. As other electrolyte, for example, an inorganic solid electrolyte using an ion conductive inorganic compound such as ion conductive ceramics, ion conductive glass, and ionic crystal; a mixture of an inorganic solid electrolyte and an electrolytic solution; a mixture of an inorganic solid electrolyte and a gelatinous electrolyte; or an organic solid electrolyte in which an electrolyte salt is dispersed in an ion conductive organic high molecular weight compound can be cited.

Further, descriptions have been given with reference to the cylinder-type secondary battery or the secondary battery using the package member such as a laminated film in the foregoing embodiment, and the coin-type secondary battery in examples. However, the present invention can be similarly applied to a secondary battery such as a button-type secondary battery and a square-type secondary battery, or a secondary battery having other structure such as a laminated structure. Further, the present invention can be applied not only to the secondary batteries, but also to other batteries such as primary batteries similarly.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
   a cathode;
   an anode; and
   an electrolyte,
   wherein the anode has a coating comprising lithium fluoride and lithium hydroxide in which a peak intensity ratio of $Li_2F^+$ to $Li_2OH^+$ ($Li_2F^+/Li_2OH^+$) obtained in positive ion analysis by Time of Flight Secondary Ion Mass Spectrometry is 1 or more, and
   wherein the anode has an anode active material layer which excludes lithium.

2. The battery according to claim 1, wherein the anode active material layer is capable of inserting and extracting lithium and contains at least one of metal elements or metalloid elements capable of forming an alloy with lithium.

3. The battery according to claim 1, wherein the anode active material layer contains at least one of silicon or tin.

4. The battery according to claim 1, wherein the cathode contains a lithium-containing complex oxide.

5. The battery according to claim 1, wherein the peak intensity ratio of $Li_2F^+$ to $Li_2OH^+$ is 4.0 or more.

6. The battery according to claim 1, wherein the peak intensity ratio of $Li_2F^+$ to $Li_2OH$ is 5.0 or more.

7. The battery according to claim 1, wherein the battery further comprises an electrolytic solution containing the electrolyte, the electrolytic solution comprising at least one fluorine containing compound.

8. The battery according to claim 7, wherein the at least one fluorine containing compound is a solvent.

9. The battery according to claim 7, wherein the at least one fluorine containing compound is a cyclic ester carbonate or a chain ester carbonate.

10. The battery according to claim 7 wherein the at least one fluorine containing compound is 4-fluoro-1,3-dioxolan-2-one or 4,5-difluoro-1,3-dioxolan-2-one.

11. The battery according to claim 1, wherein the peak intensity ratio of $Li_2F^+$ to $Li_2OH^+$ is between 1.0 and 5.3.

* * * * *